US008655589B2

(12) United States Patent
Grover et al.

(10) Patent No.: US 8,655,589 B2
(45) Date of Patent: Feb. 18, 2014

(54) SYSTEM AND METHOD FOR CONTROLLING MOTION OF SPACECRAFTS

(75) Inventors: Piyush Grover, Cambridge, MA (US); Christian Andersson, Stockholm (SE)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 207 days.

(21) Appl. No.: 13/435,641

(22) Filed: Mar. 30, 2012

(65) Prior Publication Data
US 2013/0187008 A1    Jul. 25, 2013

Related U.S. Application Data

(60) Provisional application No. 61/590,626, filed on Jan. 25, 2012.

(51) Int. Cl.
 *G05D 1/10* (2006.01)
(52) U.S. Cl.
 USPC ........................................ 701/531; 244/158.4
(58) Field of Classification Search
 USPC ..................... 244/158.1, 158.4, 158.5, 158.6; 701/531
 See application file for complete search history.

(56) References Cited

U.S. PATENT DOCUMENTS

| | | | | |
|---|---|---|---|---|
| 5,158,249 A * | 10/1992 | Uphoff | | 244/158.6 |
| 5,507,454 A * | 4/1996 | Dulck | | 244/158.5 |
| 5,961,077 A * | 10/1999 | Koppel et al. | | 244/158.5 |
| 6,059,233 A * | 5/2000 | Koppel et al. | | 244/158.5 |
| 6,097,997 A * | 8/2000 | Belbruno | | 701/13 |
| 6,149,103 A * | 11/2000 | Salvatore et al. | | 244/158.5 |
| 6,253,124 B1 * | 6/2001 | Belbruno | | 701/13 |
| 6,278,946 B1 | 8/2001 | Belbruno | | |
| 6,385,512 B1 * | 5/2002 | Belbruno | | 701/13 |
| 6,442,482 B1 * | 8/2002 | Belbruno | | 701/531 |
| 6,577,930 B2 * | 6/2003 | Belbruno | | 701/13 |
| 6,751,531 B2 * | 6/2004 | Belbruno | | 701/13 |
| 6,999,860 B2 * | 2/2006 | Belbruno | | 701/13 |
| 7,744,036 B2 * | 6/2010 | Kawaguchi et al. | | 244/158.4 |

* cited by examiner

*Primary Examiner* — Tien Dinh
*Assistant Examiner* — Michael Kreiner
(74) *Attorney, Agent, or Firm* — Dirk Brinkman; Gene Vinokur

(57) ABSTRACT

A motion of an object is controlled from a geostationary transit orbit (GTO) of an earth to an orbit of a moon. A first trajectory of the motion of the object is determined from an intermediate orbit of an earth to a neighborhood of a stable manifold of a first Lagrange point (L1). A second trajectory of the motion of the object is determined from the GTO to the intermediate orbit. A third trajectory of the motion of the object is determined from the neighborhood to the stable manifold to an L1 orbit, and a fourth trajectory of the motion of the object is determined from the L1 orbit to the orbit of the moon. A trajectory from the GTO to the orbit of the moon is determined based on a combination of the first, the second, the third, and the fourth trajectories.

11 Claims, 16 Drawing Sheets

400

| Phase | Estimate | Optimization |
|---|---|---|
| GTO to intermediate earth orbit | Hohmann transfer | Multiple shooting |
| Intermediate orbit to near L1 | Three body gravity assists kick map | Multiple shooting |
| Targeting the L1 periodic orbit | Stable manifold of L1 periodic orbit | Gauss-pseudospectral collocation |
| From L1 periodic orbit to moon orbit | Unstable manifold of L1 periodic orbit | Gauss-pseudospectral collocation |

FIG. 5

SYSTEM AND METHOD FOR CONTROLLING MOTION OF SPACECRAFTS

RELATED APPLICATION

This Application claims priority to U.S. Provisional Patent entitled, "System and Method for Controlling Motion of Spacecrafts" Application No. 61/590,626, filed on Jan. 25, 2012. The provisional application is incorporated herein by reference.

FIELD OF THE INVENTION

This invention relates generally to controlling motion of spacecrafts, and more particularly to controlling a motion of a spacecraft from an orbit of the earth to an orbit of a moon.

BACKGROUND OF THE INVENTION

Since the first lunar missions in the 1960s, the moon has been the object of interest of both scientific research and potential commercial development. During the 1980s, several lunar missions were launched by national space agencies. Interest in the moon is increasing with the advent of the multi-national space station making it possible to stage lunar missions from low earth orbit. However, continued interest in the moon and the feasibility of a lunar base depends, in part, on the ability to schedule frequent and economical lunar missions.

A typical lunar mission comprises the following steps. Initially, a spacecraft is launched from earth or low earth orbit with sufficient impulse per unit mass, or change in velocity, to place the spacecraft into an earth-to-moon orbit. Generally, this orbit is a substantially elliptic earth-relative orbit having an apogee selected to nearly match the radius of the moon's earth-relative orbit.

As the spacecraft approaches the moon, a change in velocity is provided to transfer the spacecraft from the earth-to-moon orbit to a moon-relative orbit. An additional change in velocity may then be provided to transfer the spacecraft from the moon-relative orbit to the moon's surface if a moon landing is planned. When a return trip to the earth is desired, another change in velocity is provided which is sufficient to insert the spacecraft into a moon-to-earth orbit, for example, an orbit similar to the earth-to-moon orbit. Finally, as the spacecraft approaches the earth, a change in velocity is required to transfer the spacecraft from the moon-to-earth orbit to a low earth orbit or an earth return trajectory.

FIG. 1 is an illustration of an orbital system in accordance with a conventional lunar mission in a non-rotating coordinate system wherein the X-axis 10 and Y-axis 12 are in the plane defined by the moon's earth-relative orbit 36, and the Z-axis 18 is normal to the plane. In a typical lunar mission, the spacecraft is launched from earth 16 or low earth orbit 20, not necessarily circular, and provided with sufficient velocity to place the spacecraft into an earth-to-moon orbit 22.

Near the moon 14, a change in velocity is provided to reduce the spacecraft's moon-relative energy and transfer the spacecraft into a moon-relative orbit 24 which is not necessarily circular. An additional change in velocity is then provided to transfer the spacecraft from the moon-relative orbit 24 to the moon 14 by way of the moon landing trajectory 25. When an earth-return is desired, a change in velocity sufficient to place the spacecraft into a moon-to-earth orbit 26 is provided either directly at the moon's surface or through multiple impulses as in the descent to the moon's surface. Finally, near the earth 16, a change in velocity is provided to reduce the spacecraft's earth-relative energy and return the spacecraft to low earth orbit 20 or to earth 16 via the earth-return trajectory 27.

It is desired to design a trajectory that minimizes fuel consumption, and which can deliver the spacecraft to a specified orbit around the moon, within a specified amount of time-of-flight. Usually, this problem is solved by a Hohmann transfer and patched conics approach, which patches together solutions from the earth-object and moon-object two-body problems. This approach leads to trajectories that can be completed in a small number of days, but with a suboptimal fuel consumption.

Recently, advances have been made to obtain greater understanding of the three-body problem that considers gravity of the moon, and finding trajectories which can use less fuel than the Hohmann-transfer based trajectories. However, the three-body problem is chaotic and highly sensitive to initial conditions. While above a minimum energy level, there are many trajectories the spacecraft can use. However, most of the trajectories take too long to be useful.

A typical trajectory in the three-body system is a spiraling trajectory. This feature is characteristic of chaotic systems. Hence the problem of finding the trajectories to the moon-orbit is a non-trivial task.

The conventional methods for determining trajectories as a three-body control problem have some important drawbacks. For example, methods based on weak-stability boundary (WSB) or methods based on bi-circular model transport the object very far away from earth (around 1.2 million K ms), which is undesirable due to limited capability of some ground-stations to monitor the object beyond the orbit of the moon.

Another method have computed trajectories from a very large earth orbit, and hence used manifold transfers directly. Also, those methods concentrate on finding specific trajectories, and are not sufficient to design end-to-end control procedure.

Another method directly transfers the object onto stable manifolds, but lacks the flexibility to satisfy various orbit constraints.

Accordingly, there is a need for a method that can systematically design low energy end-to-end trajectories from an orbit around the earth to an orbit around the moon.

SUMMARY OF THE INVENTION

It is an object of embodiments of an invention to provide a system and a method for controlling a motion of an object from a geostationary transit orbit (GTO) of an earth to an orbit of a moon. For example, it is an objective of one embodiment to provide an end-to-end low fuel design of a trajectory, and set of controls to move the object from GTO to a specified orbit around the moon, within a specified amount of time-of-flight.

It is further objective of some embodiments to provide a discrete control profile, such that the control can be actuated at a finite number of points during the trajectory by a thruster on board the object. It is further objective of some embodiments to provide such control method that the object does not travel further than the orbit of the moon at any time during the transfer by more than a few thousand kilometers. This constraint is advantageous for some application due to limited capability to monitor the object beyond the orbit of the moon.

Some embodiments of the invention are based on a realization that determining the trajectory for the object is a three-body problem, involving the earth, the moon and the object. It is further realized, that the motion of the object is qualitatively different in different regions of the space, because of different impact on the object by the earth and the moon. It is further realized that it is advantageous to use a stable manifolds of motion existing between the earth and the moon to optimize the fuel consumption.

Furthermore, it is specifically realized that the problem of determining the trajectories can be optimized by partitioning the trajectory into four phases of control. In each phase the object is subject to a specific combination of the forces, and thus, the determination of the trajectory can be handled efficiently by this partitioning.

In various embodiments of the invention, the four phases are determined for the motion of the object corresponding to a first segment from the GTO to an intermediate orbit of Earth, a second segment from the intermediate orbit to a neighborhood of a stable manifold of a first Lagrange point (L1), a third segment from the neighborhood of the L1 point to an L1 orbit, and a fourth segment from the L1 orbit to the orbit of the moon. The final control trajectory includes a combination of trajectories determined for these four phases.

For example, some embodiments determine a first trajectory of the object from an intermediate orbit around the earth to a neighborhood of the stable manifold of the first Lagrange point (L1). In one embodiment, this determination is accomplished by first computing several segments of zero-fuel trajectories that can be used to form the complete trajectory. These segments can be determined using a function that approximates the effect of moon on the object when the object is within a substantial influence of the gravity of the earth. Then, a sequence of initial estimates for the first trajectory is formed by combining the various apses of these zero-fuel trajectories, according to various topologies that satisfy time constraints. It is realized that the time of flight during this phase of the mission is determined mostly by the topology of the trajectory.

In some embodiments, a multiple-shooting problem is then formed by forcing continuity constraints along with the estimates and including possible control inputs at the apses. This multiple-shooting problem is solved by a nonlinear programming software which minimizes the total control input. It is also realized that this optimization problem is highly sensitive to initial estimates that are used during the optimization procedure, and hence it is imperative to have a systematic procedure of obtaining the initial guess.

Next, some embodiments determine a second trajectory of the object from GTO to the intermediate orbit of an earth, e.g., to an initial condition of the first trajectory. Because the moon is far away from this section of the trajectory, the Hohmann transfer provides a good guess for such a trajectory. The initial estimate may be determined by using the apses from the Hohmann transfer trajectory are used along with continuity constraints and a multiple shooting problems may be formed, and solved to minimize the required control input.

Some embodiments determine a third trajectory of the object from the neighborhood of the stable manifold of L1 to the L1 periodic orbit. The set of initial estimates for the third trajectory can be obtained by integrating several trajectories forward in time from the neighborhood of a stable manifold, and recording the apses. These initial conditions typically lead to trajectories that go either through the L1 periodic orbit to the moon, or return to earth.

In some embodiments, a Gauss-pseudospectral collocation problem is formulated by representing the trajectory segment between two consecutive apses by polynomials, which allows for a discontinuity at the apses due to control actuation. The final condition may be selected to be an arbitrary location in the desired L1 periodic orbit. This collocation problem can also be solved using nonlinear programming that minimizes the control input.

Some embodiments determine a fourth trajectory of the object from L1 periodic orbit to the specified orbit around the moon. A random initial condition on the L1 periodic orbit may be selected as the initial estimate and the unstable manifold originating from that initial condition may serve as the initial estimate of the complete trajectory. A Gauss-pseudospectral collocation problem may be formulated by partitioning the trajectory into two phases. The first phase involves travel along the unstable manifold, and the second phase involves travel off the manifold to a location on the specified orbit around the moon. Depending upon the size of the specified moon orbit, the second phase may be not required.

If the two phases are required, the phases can be determined by optimizing a cost function that is a sum of two control inputs, one at beginning and the other at the end of the second phase. The first control input moves the object away from the unstable manifold and the second control input puts the object into the orbit around the moon. This optimization problem may also be solved via nonlinear programming.

Accordingly, one embodiment of the invention discloses a method for controlling a motion of an object from a geostationary transit orbit (GTO) of an earth to an orbit of a moon. The method includes determining a first trajectory of the motion of the object from an intermediate orbit of an earth to a neighborhood of a stable manifold of a first Lagrange point (L1); determining a second trajectory of the motion of the object from the GTO to the intermediate orbit; determining a third trajectory of the motion of the object from the neighborhood to the stable manifold to an L1 orbit; determining a fourth trajectory of the motion of the object from the L1 orbit to the orbit of the moon; and determining a trajectory from the GTO to the orbit of the moon based on a combination of the first trajectory, the second trajectory, the third trajectory, and the fourth trajectory.

Another embodiment discloses a method for controlling a motion of an object from a geostationary transit orbit (GTO) of an earth to an orbit of a moon. The method includes determining a first trajectory of the motion of the object from an intermediate orbit of an earth to a neighborhood of a stable manifold of a first Lagrange point (L1) as a function of a time of flight; determining a second trajectory of the motion of the object from the GTO to the intermediate orbit based on a set of initial conditions of the first trajectory; determining a third trajectory of the motion of the object from the neighborhood to the stable manifold based on a set of final conditions of the first trajectory; determining a fourth trajectory of the motion of the object from an L1 orbit to the orbit of the moon based on a size of the L1 orbit; and determining a trajectory from the GTO to the orbit of the moon as a combination of the first trajectory, the second trajectory, the third trajectory, and the fourth trajectory. The steps of the method can be performed by a processor.

Yet another embodiment discloses a system for controlling a motion of an object from a geostationary transit orbit (GTO) of an earth to an orbit of a moon, comprising a processor for determining a trajectory from the GTO to the orbit of the moon based on a combination of a first trajectory, a second trajectory, a third trajectory, and a fourth trajectory, wherein the first trajectory moves the object from an intermediate orbit of an earth to a neighborhood of a stable manifold of a first Lagrange point (L1), wherein the second trajectory moves the object from the GTO to the intermediate orbit; wherein the third trajectory moves the object from the neighborhood to the stable manifold to an L1 orbit; and wherein the fourth trajectory moves the object from the L1 orbit to the orbit of the moon.

BRIEF DESCRIPTION OF THE DRAWINGS

FIG. 5 is a table of partitioning of trajectory determinations, and corresponding principles of optimization;

DETAILED DESCRIPTION OF THE PREFERRED EMBODIMENT

Various embodiments of an invention determine a trajectory for a motion of an object from a Geostationary Transfer Orbit (GTO) of the earth to an orbit around the moon, within a specified time. Some embodiments use planar circular restricted three-body problem (PCR3BP) model, involving the motion of the earth, the moon and the object for an initial trajectory. The PCR3BP model is a mathematical model used to determine the motion of the object (such as a space probe) in an earth-moon system. The system is four-dimensional system, and a state of the system is uniquely determined by four variables, usually the X and Y coordinates, and the X and Y velocities.

In various embodiments the effect of sun in the initial trajectory is neglected. However, some embodiments, after determining the initial trajectory, refines the trajectory using a more accurate model, which includes the effects of sun and other relevant planets.

Figure 1:
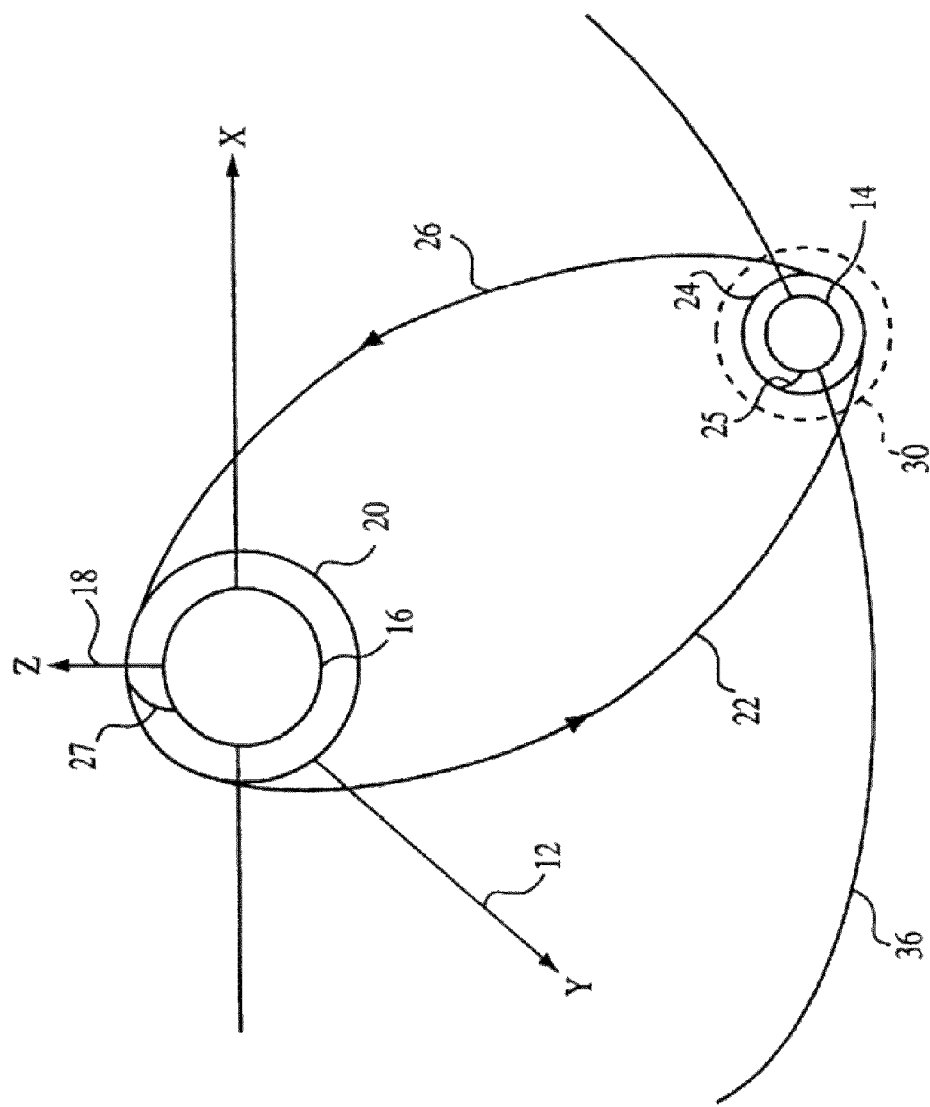
FIG. 1 is a schematic of an orbital system in accordance with a conventional lunar mission in a non-rotating coordinate system.
Figure 2:
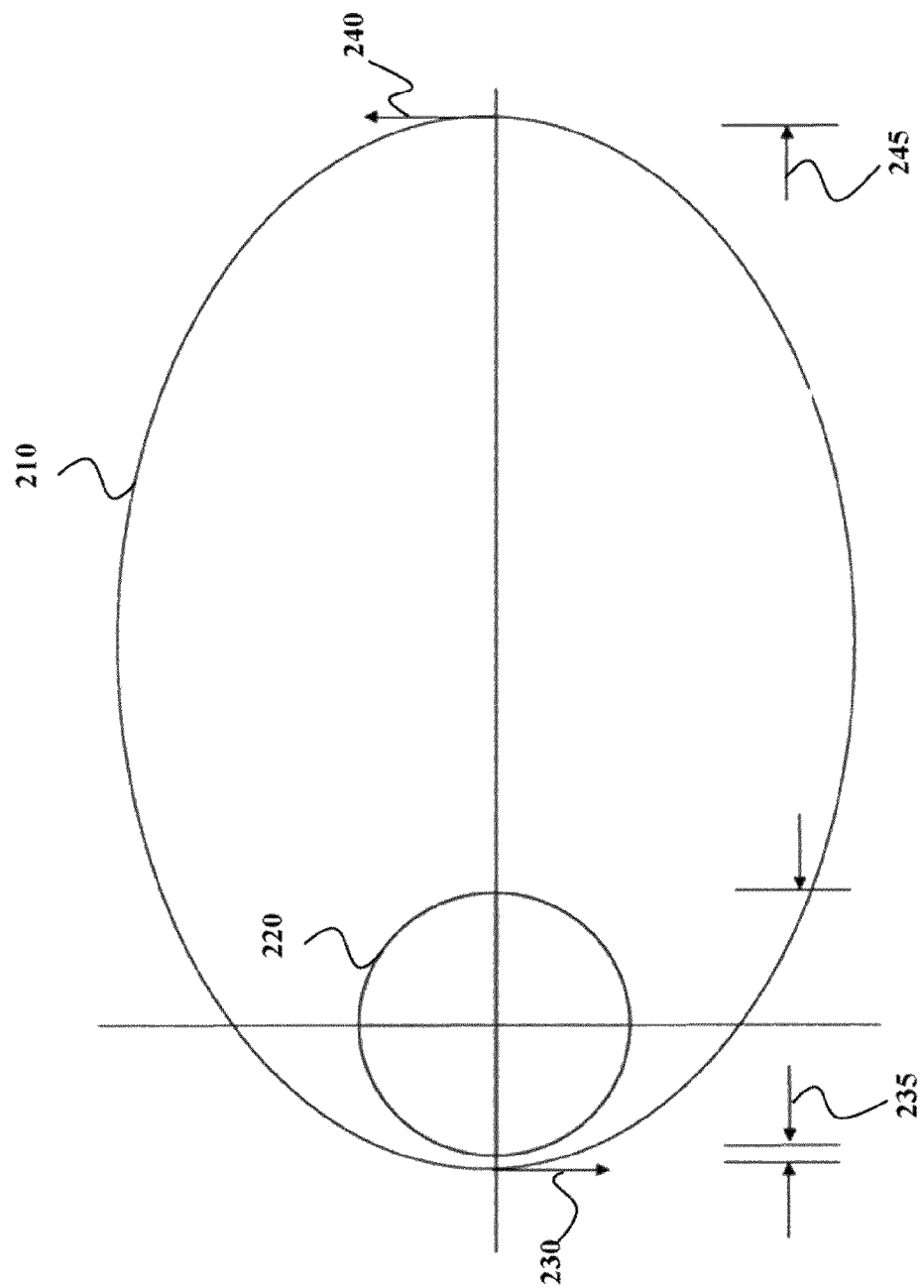
FIG. 2 is a schematic of GTO orbit used by some embodiments of an invention as a starting orbit.

FIG. 2 shows a schematic of the GTO orbit 210 used by some embodiments of the invention as a starting orbit. The radius of the earth 220 is 6,388 km. The perigee velocity 230 is 10.2 km/s, and the apogee velocity 240 is 1.6 km/s. The perigee height 235 is 250 km; and the apogee height 245 is 35,863 km.

Figure 3:
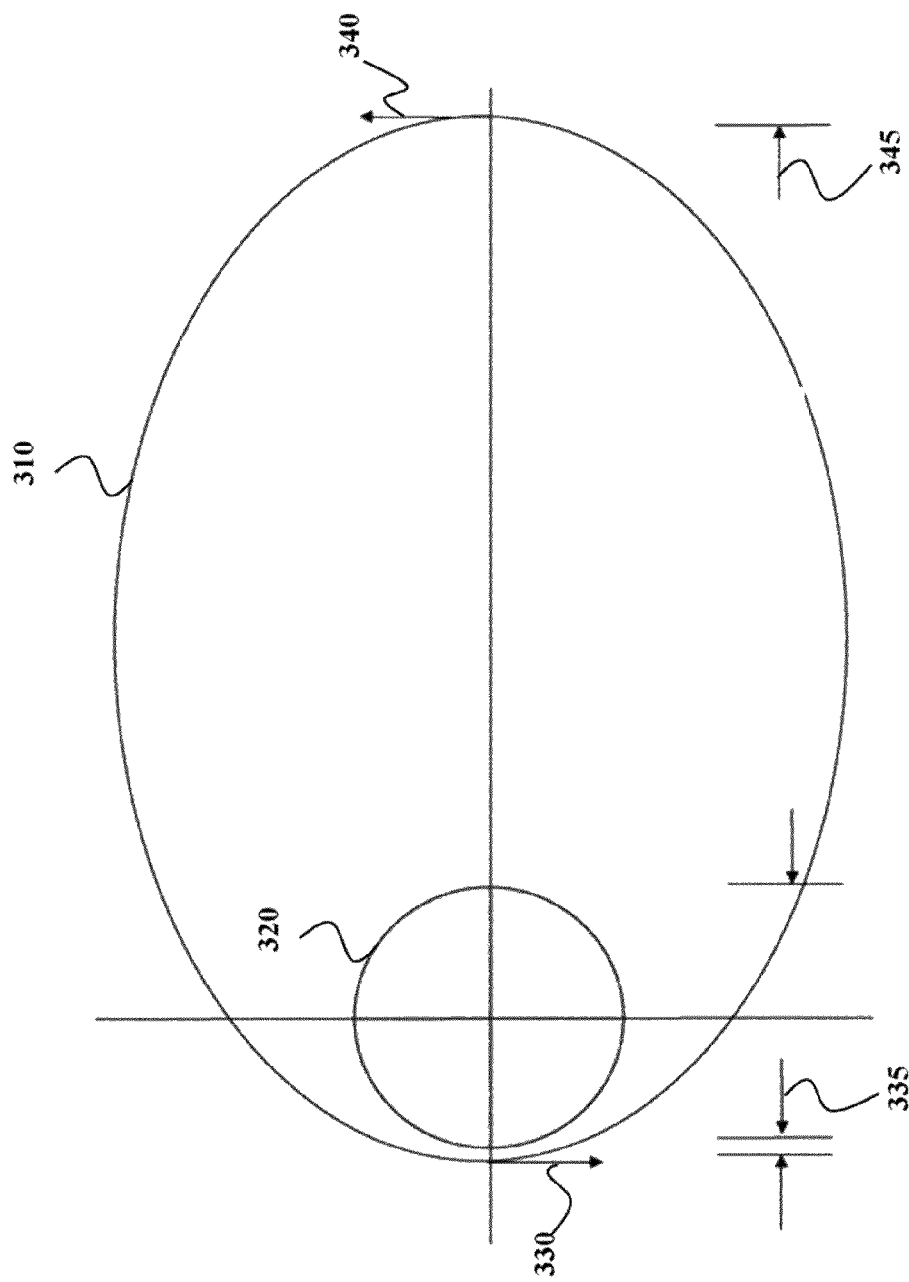
FIG. 3 is a schematic of moon orbit used by some embodiments of the invention as a final orbit.

Similarly, FIG. 3 shows a schematic of moon orbit 310 used by embodiments of the invention as a final orbit. The radius of moon 320 is 1,738 km. The perilune velocity 330 is 1.8 km/s, and the apolune velocity 340 is 1.3 km/s. The perilune height 335 is 100 km, and the apolune height 345 is 800 km.

In various embodiments, the profile of the trajectory is discrete, i.e., the control is actuated at a finite number of locations during the trajectory by a thruster on board the object. Some embodiments use an additional constraint that the object is not transported farther than the orbit of the moon by more than a few thousand kilometers. This constraint is due to limited capability of some ground-stations to monitor the object beyond the orbit of the moon.

Figure 4:
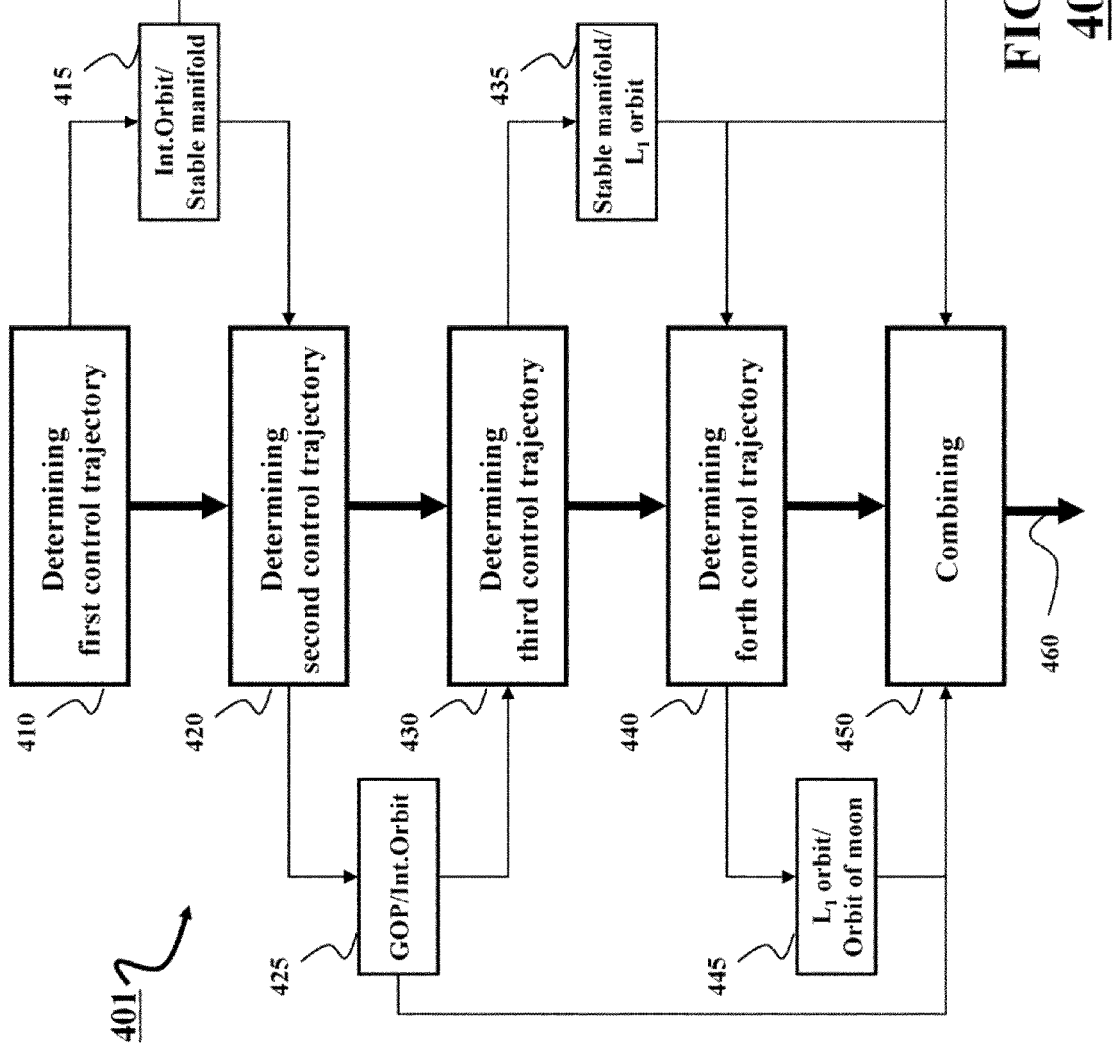
FIG. 4 is a diagram of a method for controlling a motion of an object from a GTO of the earth to an orbit of a moon according to some embodiments of the invention.

FIG. 4 shows a block diagram of a method 400 for controlling the motion of an object from a GTO of the earth to an orbit of the moon according to some embodiments of the invention. The method 400 determines a trajectory 460 from the GTO to the orbit of the moon. As used herein, "trajectory" refers to a sequence of coordinates in four-dimensions, which can be obtained by optimization during the mission planning. The information needed to obtain this sequence includes at least one of an initial condition; discrete control inputs; and times at which those inputs are applied. The trajectory can be obtained by integrating the equations of motion using the PCR3BP.

The method 400 determines 410 a first trajectory 415 of the motion of the object from an intermediate orbit of an earth to a neighborhood of a stable manifold of a first Lagrange point (L1). For example, the first trajectory can be determined as a function of a time. Next, a second trajectory 225 of the motion of the object from a GTO to the intermediate orbit is determined 220. For example, the second trajectory can be determined based on a set of initial conditions of the first trajectory.

A third trajectory 435 of the motion of the object from the neighborhood to the stable manifold is determined 430 based on, e.g., a set of final conditions of the first trajectory 415. A fourth trajectory 445 of the motion of the object from an L1 orbit to the orbit of the moon is determined 440 based on, e.g., a size of the L1 orbit. The trajectory 460 from the GTO to the orbit of the moon is determined as a combination 450 of the first trajectory, second trajectory, third trajectory, and fourth trajectory. The method 400 can be implemented using a processor 401.

Various embodiments of the invention are based on a realization that the problem of determining trajectories can be optimized by partitioning the trajectory into four phases of control. In each phase, the object is subject to a combination of forces, and thus, the determining of trajectory can be handled efficiently by this partitioning. Such partitioning can take an advantage of specific force acting on the object, as well as zero fuel trajectories on a path from the earth to the moon. "Zero fuel trajectory" refers to a sequence of coordinates in the four-dimensions, which complete describes the trajectory of the object in the PCR3BP for a finite time. This trajectory does not use any control input, and is only determined by integrating the system of equations with an initial condition forward or backward for the specified time.

FIG. 5 shows a table of the partitioning 510 of trajectories, and corresponding principles 520 of optimization 530 of the determining the trajectory for each segment according to one embodiment of the invention, as described in more details below.

First Trajectory

The first step according to this embodiment determines a first trajectory of the object from an intermediate orbit around the earth to a neighborhood of the stable manifold of the first Lagrange point (L1).

This step can be accomplished by first determining several segments of zero-fuel trajectories to form the complete trajectory. These segments can be determined using a kick function F that approximates the effect of the gravity of the moon on the object when the object is within the sphere of influence of the earth.

In one embodiment, the function F is $$F\begin{pmatrix} \omega_{n+1} \\ K_{n+1} \end{pmatrix} = \begin{pmatrix} \omega_n - 2\pi(-2K_{n+1})^{-3/2} (\text{mod} 2\pi) \\ K_n + \mu f(\omega_n, K_n) \end{pmatrix}. \qquad \text{(Eq. 1)}$$

wherein
$\omega_i$=Angle of apoapse at ith iterate
$K_i$=Keplerian energy at ith iterate
$\mu$=Mass parameter of PCR3BP The function F gives the approximate evolution of the angle of apoapse, and the semi-major axis of the object [during one revolution around the earth. The function F can be predetermined by integrating the perturbations of the moon's gravity over an unperturbed Keplerian orbit.

Figure 6:
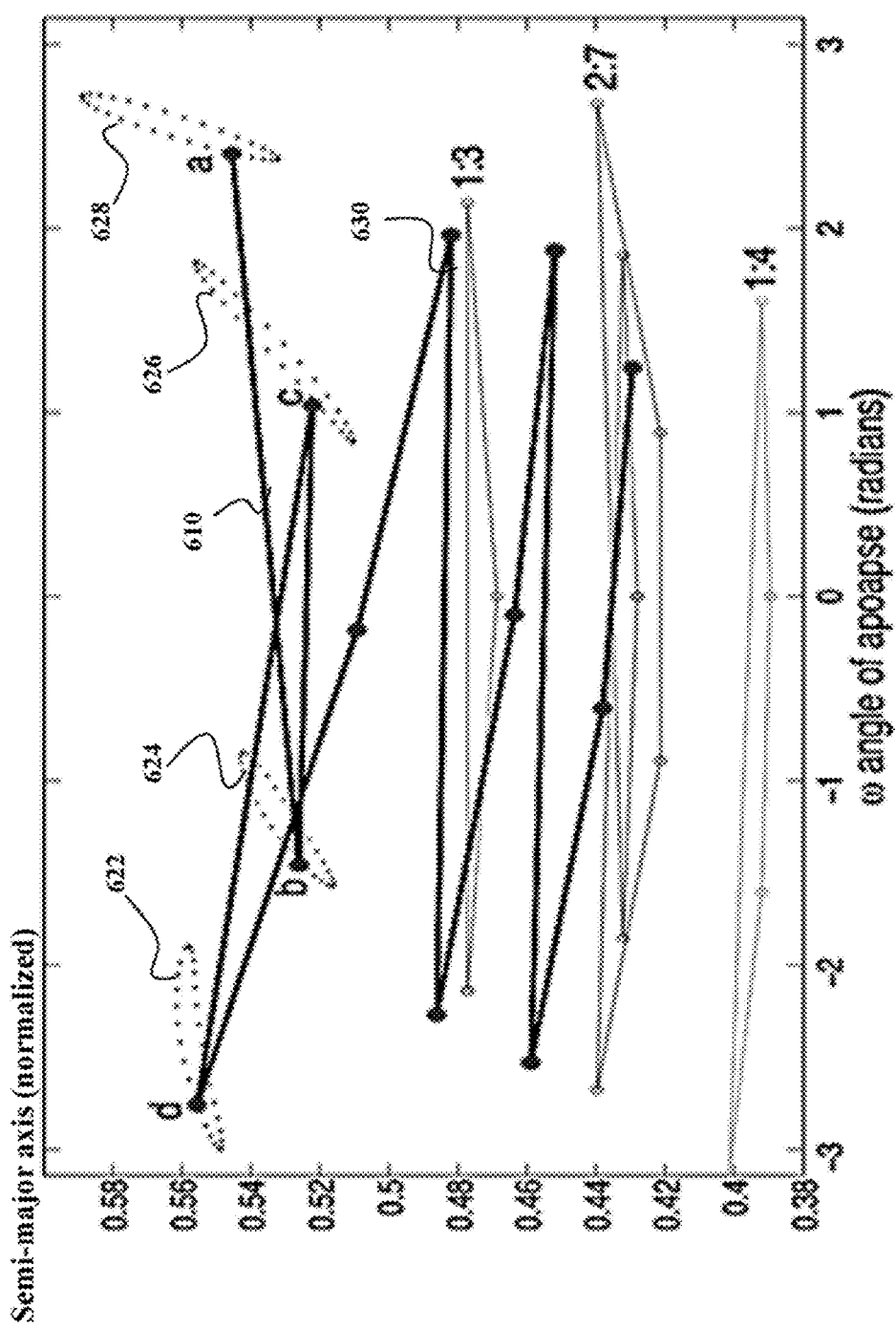
FIG. 6 is a graph of a zero-fuel trajectory.

FIG. 6 shows an example of zero-fuel trajectory, in the a-w (i.e., semi-major axis Vs angle of apoapse) plane, along with the various resonances. A typical influence by the gravity of the moon is experiences after 630, which leads to increase in the semi-major axis. Travel between two consecutive apoapse is shown by segments such as 610. Various stable manifolds of L1 Lyapunov orbit is shown as 622, 624, 626, 628.

A sequence of the initial estimates for the first trajectory is formed by combining the various apses of the zero-fuel trajectories, according to various topologies that satisfy time constraints. It is realized that the time during this phase is determined mostly by the topology of the trajectory.

Forcing continuity constraints and the estimates and including possible control inputs at the apses then form a multiple-shooting problem.

At each apse, the following vector is solved, (x y $v_x$ $v_y$ $\delta v_x$ $\delta v_y$ t) subject to the continuity constraint:

$$\begin{pmatrix} \phi_{t_0}(X_0 + [0 \ 0 \ \delta v_{x_0} \ \delta v_{y_0}]^T) - X_1 \\ \phi_{t_1}(X_1 + [0 \ 0 \ \delta v_{x_1} \ \delta v_{y_1}]^T) - X_2 \\ \vdots \\ \phi_{t_{n-1}}(X_{n-1} + [0 \ 0 \ \delta v_{x_{n-1}} \ \delta v_{y_{n-1}}]^T) - X_n \end{pmatrix} = \begin{pmatrix} 0 \\ 0 \\ \vdots \\ 0 \end{pmatrix}. \qquad (2)$$

The function $\phi t$ represents the time-t mapping with given initial condition. The various $X_i$ represent the vectors at different locations.

This multiple-shooting problem is solved by nonlinear programming, which minimizes the total control input. This optimization problem is sensitive to the initial estimates that are used during the optimization, and it is advantageous to use systematic procedure for obtaining the initial estimate.

Figure 7:
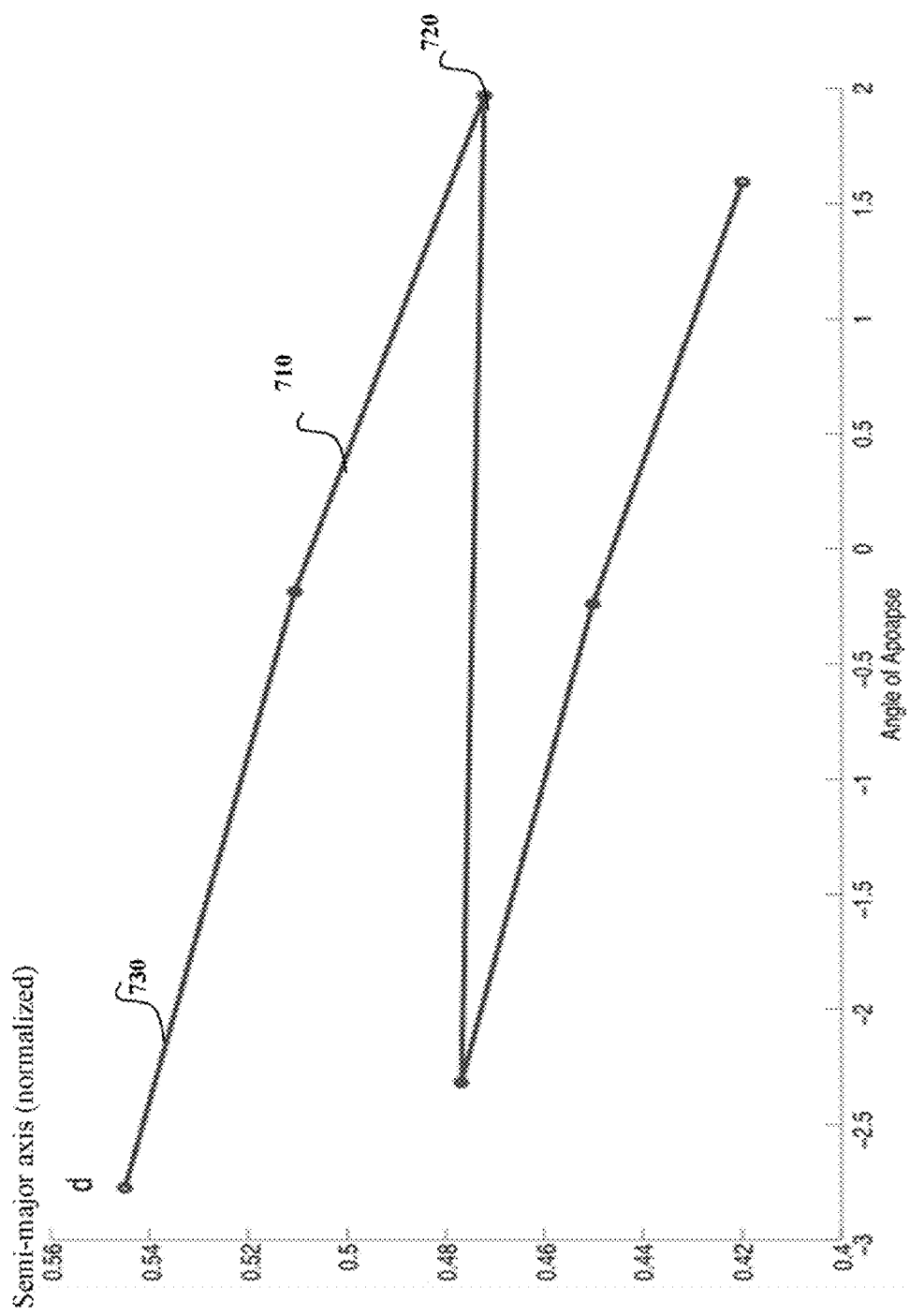
FIG. 7 is a graph of the first trajectory according to some embodiments of the invention.

FIG. 7 shows an example of the first trajectory determined for the zero-fuel trajectory, up to the first intersection with a stable manifold of (a periodic orbit around) L1. A typical optimized influence from the moon is experienced after a location 710, which leads to an increase in the semi-major axis. The trajectory between two consecutive apoapse is shown by segments, such as 720. The segment of the trajectory near the first cut of stable manifold of the L1 Lyapunov orbit with apoapse plane is shown as 730.

Figure 8:
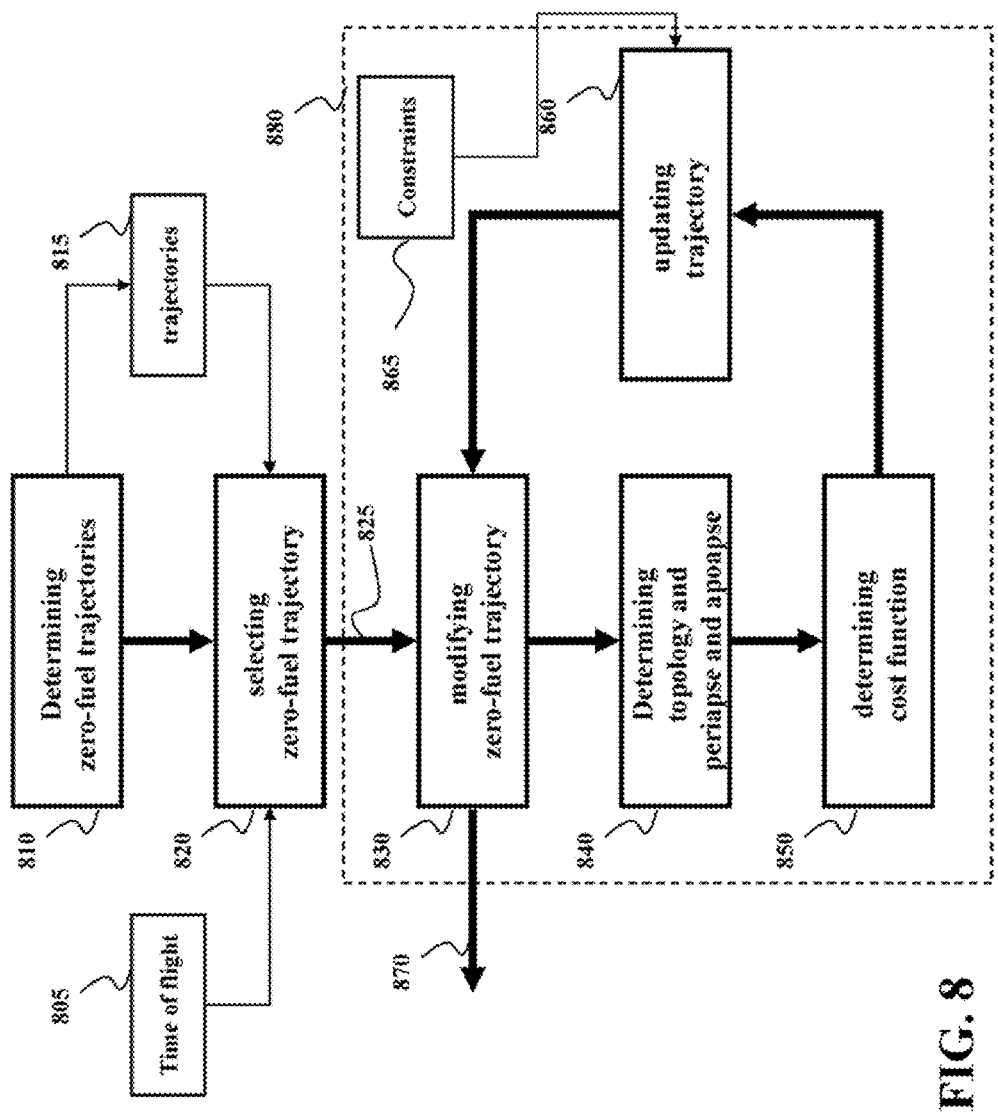
FIG. 8 is a diagram of a method for determining the first trajectory according to some embodiments.

FIG. 8 shows a block diagram of a method for determining the first trajectory according to some embodiments. The method includes determining 810 a set of zero-fuel trajectories 815 from a set of orbits of the earth to the neighborhood of L1 stable manifold. The trajectories 815 can be determined, e.g., using an approximate mapping of a perturbation of the motion by a gravity of the moon. A zero-fuel trajectory 825 optimizing the time of the flight 805 is selected 820, and the first trajectory 870 is determined based on modifying 830 the zero-fuel trajectory 825 to satisfy a constraint on the time of flight, while optimizing the consumption of the fuel.

For example, one embodiment modifies the zero-fuel trajectory recursively 880. The embodiment determines 840 a topology of the first trajectory based on a topology of the zero-fuel trajectory and the function of the time, and selects the periapse and the apoapse locations at the zero-fuel trajectory according to that topology. Next, a cost function of controls applied to the object in the periapse and apoapse locations is determined 850, and the first trajectory is updated 860 by optimizing the cost function subject to continuity constraints of Equation (2).

Second Trajectory

In one embodiment, the second trajectory of the object from GTO to the intermediate orbit is determined based on a set of initial conditions of the first trajectory. Because the moon is far away from this section of the trajectory, the Hohmann transfer provides a good estimate for such a trajectory. The initial estimate determined by using the apses from the Hohmann transfer trajectory are used along with continuity constraints and a multiple shooting problems is formed, and solved as before to minimize the control input required.

Figure 9:
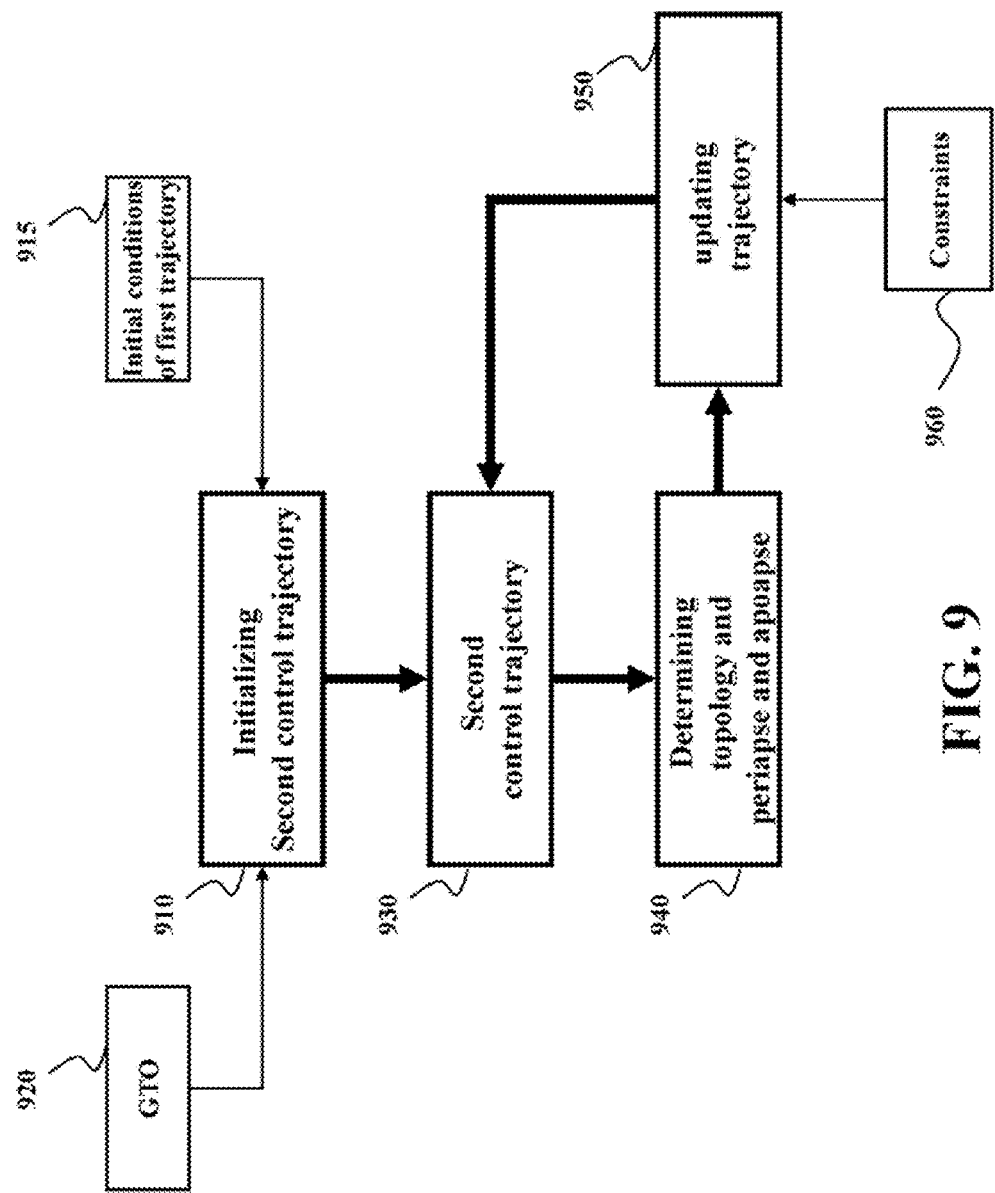
FIG. 9 is a diagram of a method for determining the second trajectory according to some embodiments.

FIG. 9 shows a block diagram of a method for determining the first trajectory according to some embodiments. The method initializes 910 the second trajectory 930 using Hohmann transfer solution having GTO 920 as an initial condition and the set of initial conditions 915 of the first trajectory as a final condition.

Next, the method determines 940 a cost function of controls applied to the object in the periapse and the apoapse points of the second trajectory and updates 950 the second trajectory by optimizing the cost function subject to continuity constraints 960.

Third Trajectory

Then, the third trajectory of the object is determined for a segment from the neighborhood of the stable manifold of L1 to the L1 periodic orbit. The set of initial estimates for this phase can be obtained by integrating several trajectories forward in time from the neighborhood of stable manifold, and recording the apses. These initial conditions typically lead to trajectories that go either through the L1 periodic orbit to the moon, or return to earth.

Some embodiments determine the third trajectory using a pseudo-spectral collocation method. For example, a Gauss-pseudospectral collocation problem can be formulated by representing the trajectory segment between two consecutive apses by polynomials, which allows for discontinuity at the apses due to control actuation. Both state and control of the object can be approximated using global polynomials.

In one embodiment, the state is approximated using a basis of Lagrange interpolating polynomials, i.e.

$$x(\tau) \approx X(\tau) = \sum_{i=0}^{N} X(\tau_i) L_i(\tau)$$

wherein
$x(\tau)$=Actual state at t=τ
$X(\tau)$=Interpolated state at t=τ

$X(\tau_t)$=Interpolation coefficient
$L_i(\tau$=Langrange polynomial

Similarly, the control can also be approximated using Lagrange polynomials.

Then, the collocation is performed at the Legendre-Gauss points, i.e., the roots of the N degree Legendre polynomial. The cost functional is approximated via a Gauss-quadrature at the Legendre-Gauss points.

In one embodiment, the final condition is selected as a point on the L1 periodic orbit. This collocation problem can be solved using a nonlinear programming, minimizing the control input.

Figure 10:
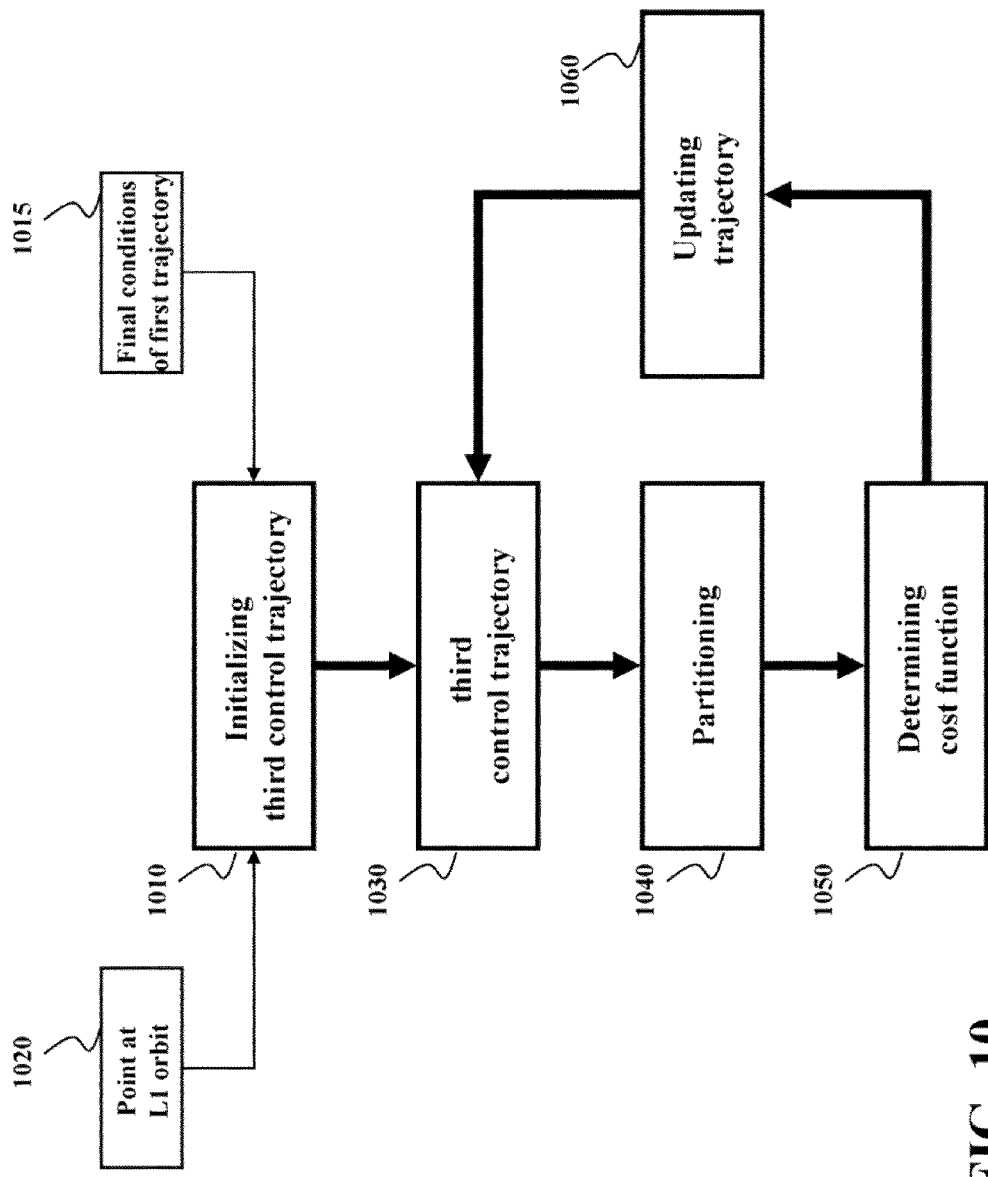
FIG. 10 is a diagram of a method for determining the third trajectory according to some embodiments.

FIG. 10 shows a block diagram of a method for determining the first trajectory according to some embodiments. The method initializes 1010 the third trajectory 1030 based on the set of final conditions 1015 of the first trajectory and a location at L1 orbit 1020. Next, the third trajectory is partitioned 1040 into a set of phases based on apses of the third trajectory, such that a phase connects two consecutive apses. Next, the method determines 1050 a cost function of controls applied to the object at the end of each phase, and updates 1060 the third trajectory by optimizing the cost function.

Some embodiment optimizes the cost function using a pseudo-spectral collocation method. The Karush-Kuhn-Tucker (KKT) conditions derived are identical to the discretized form of first-order optimality conditions at the Legendre-Gauss points. Typically, this leads to faster convergence as compared to other collocation schemes.

Figure 13:
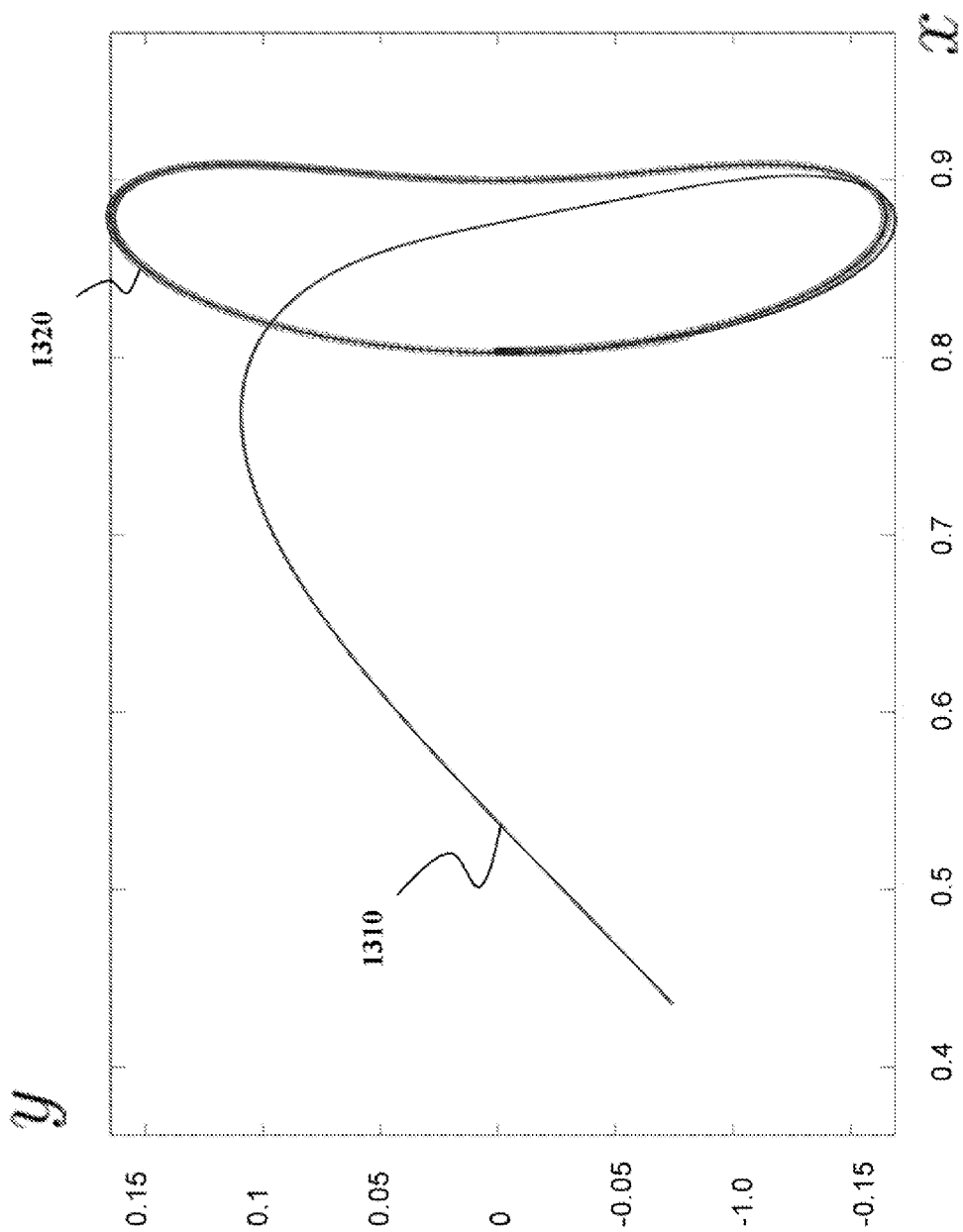
FIG. 13 is a graph of insertion of the object into a Lyapunov orbit.

FIG. 13 shows an insertion 1310 of the object into L1 orbit 1320 according to some embodiments.

Fourth Trajectory

The fourth trajectory of the object is determined for a segment from L1 periodic orbit to the specified orbit around the moon. A random initial condition on the L1 periodic orbit can be selected as the initial estimate and the unstable manifold originating from that initial condition can serve as initial estimate of the complete trajectory. Some embodiments determine the fourth trajectory using a pseudo-spectral collocation method. For example, the Gauss-pseudo-spectral collocation problem can be formulated by partitioning the trajectory into two phases.

The first phase of the fourth trajectory controls trajectory of the object along the unstable manifold, and the second phase controls trajectory from the manifold to a location on the specified orbit around the moon. Depending upon the size of the orbit of the moon, the second phase may be optional. But generally, two phases are required, and are determined by optimizing a cost function that is the sum of two control inputs, one at beginning and the other at the end of the second phase. The first control input moves the object away from the unstable manifold and the second control input puts the object into the orbit around the moon. The optimization process selects the correct departure location of the object, and the correct unstable trajectory. The departure location for optimal trajectory is a function of the size/energy of the L1 orbit.

Figure 11:
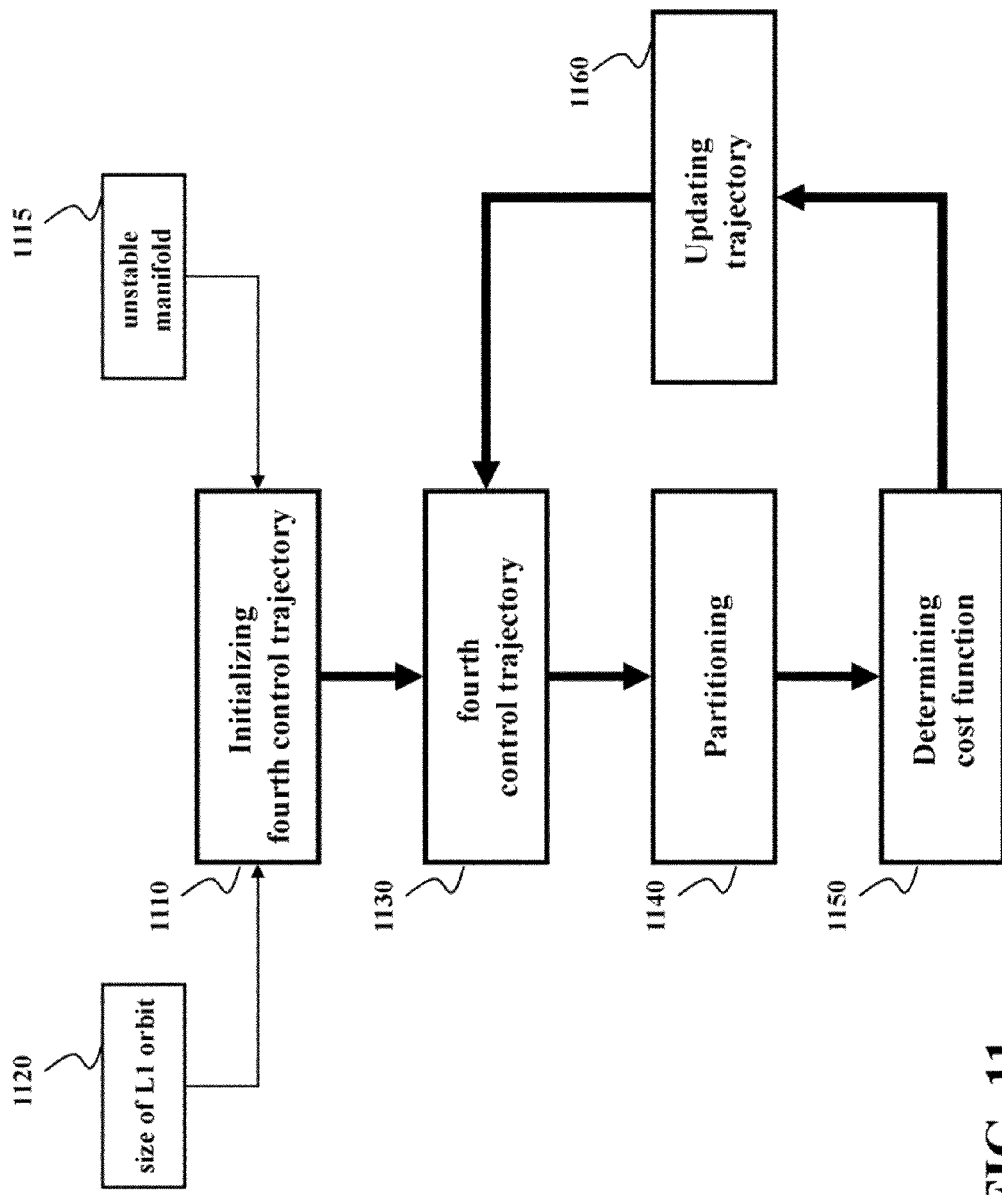
FIG. 11 is a diagram of a method for determining the fourth trajectory according to some embodiments.

FIG. 11 shows a block diagram of a method for determining the first trajectory according to some embodiments. The method initializes 1110 the fourth trajectory 1130 based on the size of the L1 orbit 1120 using an unstable manifold 1115 of the L1 orbit, and partitions 1140 the fourth trajectory into a set of phases.

Next, the method determines 1150 a cost function of controls applied to the object at the end of each phase, and updates the fourth trajectory by optimizing the cost function using a pseudo-spectral collocation method. This optimization problem can also be solved via nonlinear programming.

Figure 12:
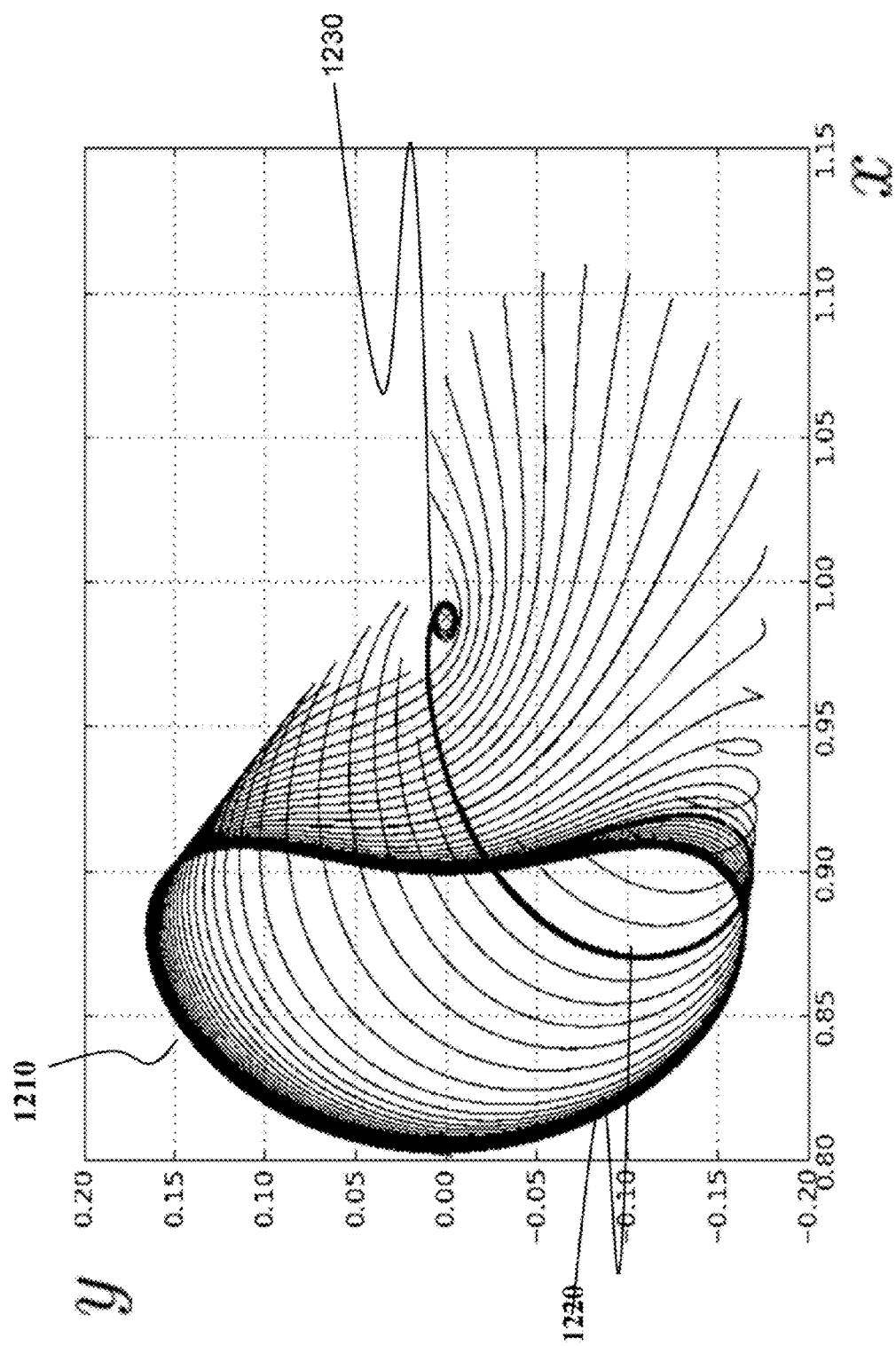
FIG. 12 is an example of insertion of the object into a moon-orbit.
Figure 14:
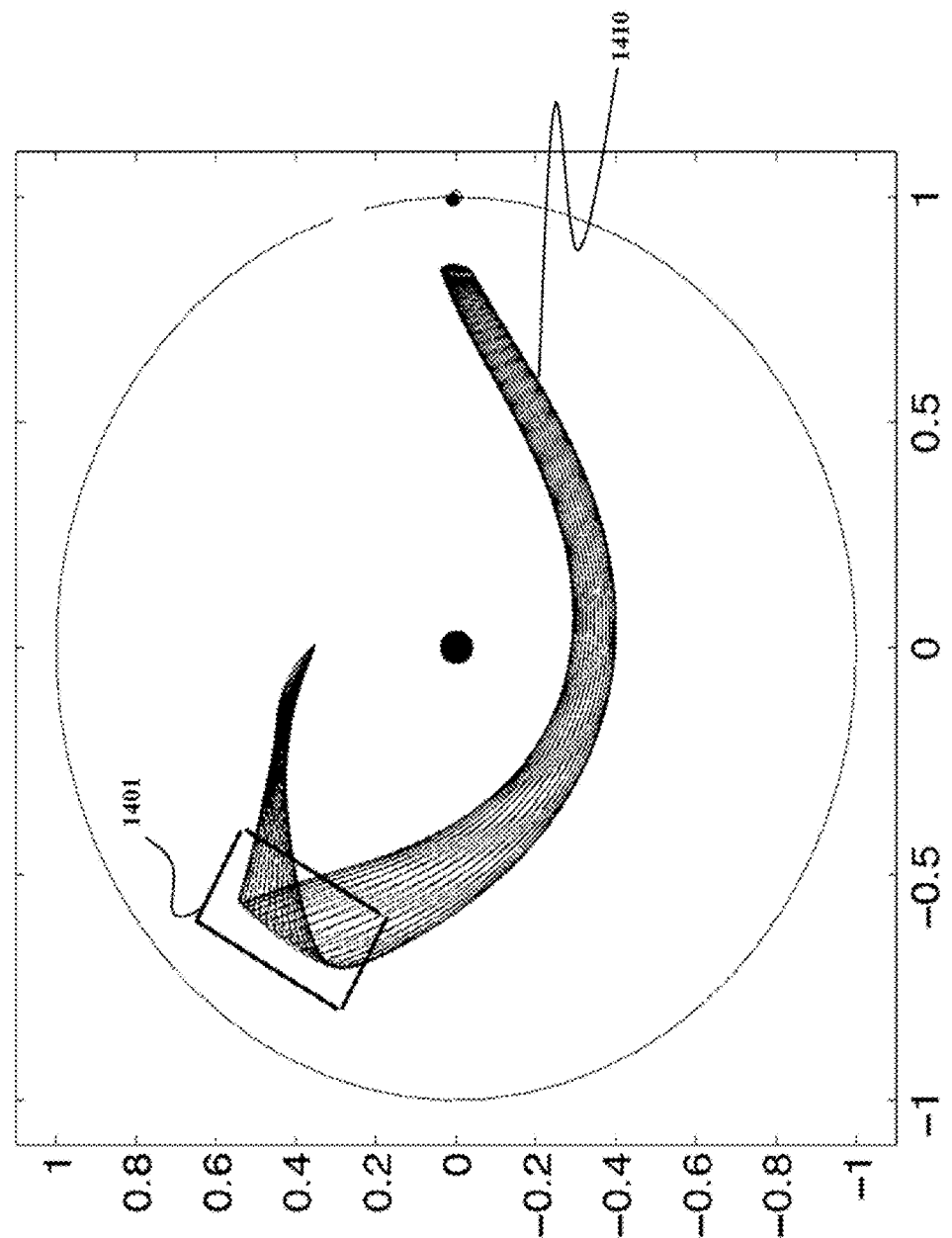
FIG. 14 is a graph of a section at the apoapse of the stable manifold of L1 Lyapunov orbit.

FIG. 12 shows an example of 1220 insertion of the object into a 1230 moon-orbit, starting from a 1210 L1 orbit. FIG. 14 shows a section 1401 at the apoapse of 1410 the stable manifold of L1 Lyapunov orbit.

Figure 15:
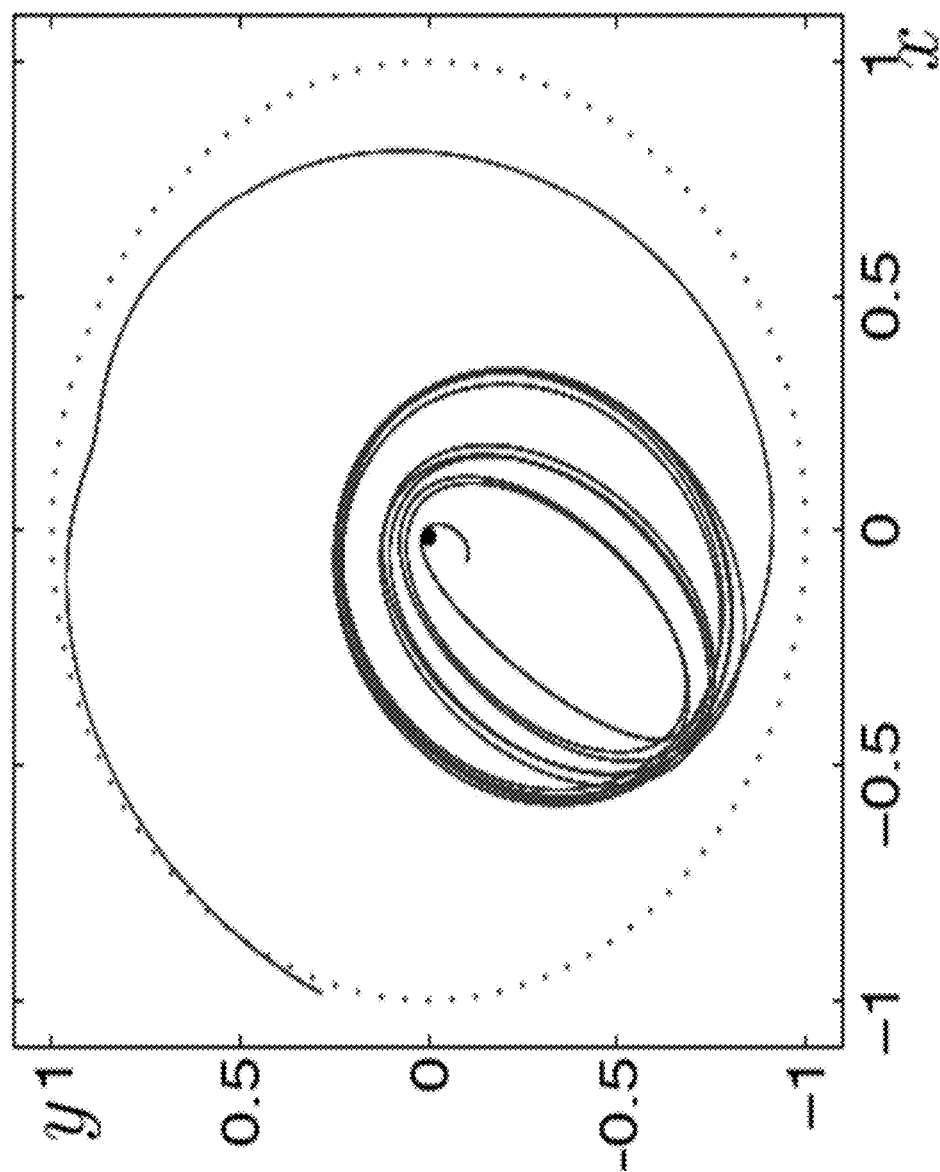
FIGS. 15 and 16 are examples graphs of complete trajectory of the object.
Figure 16:
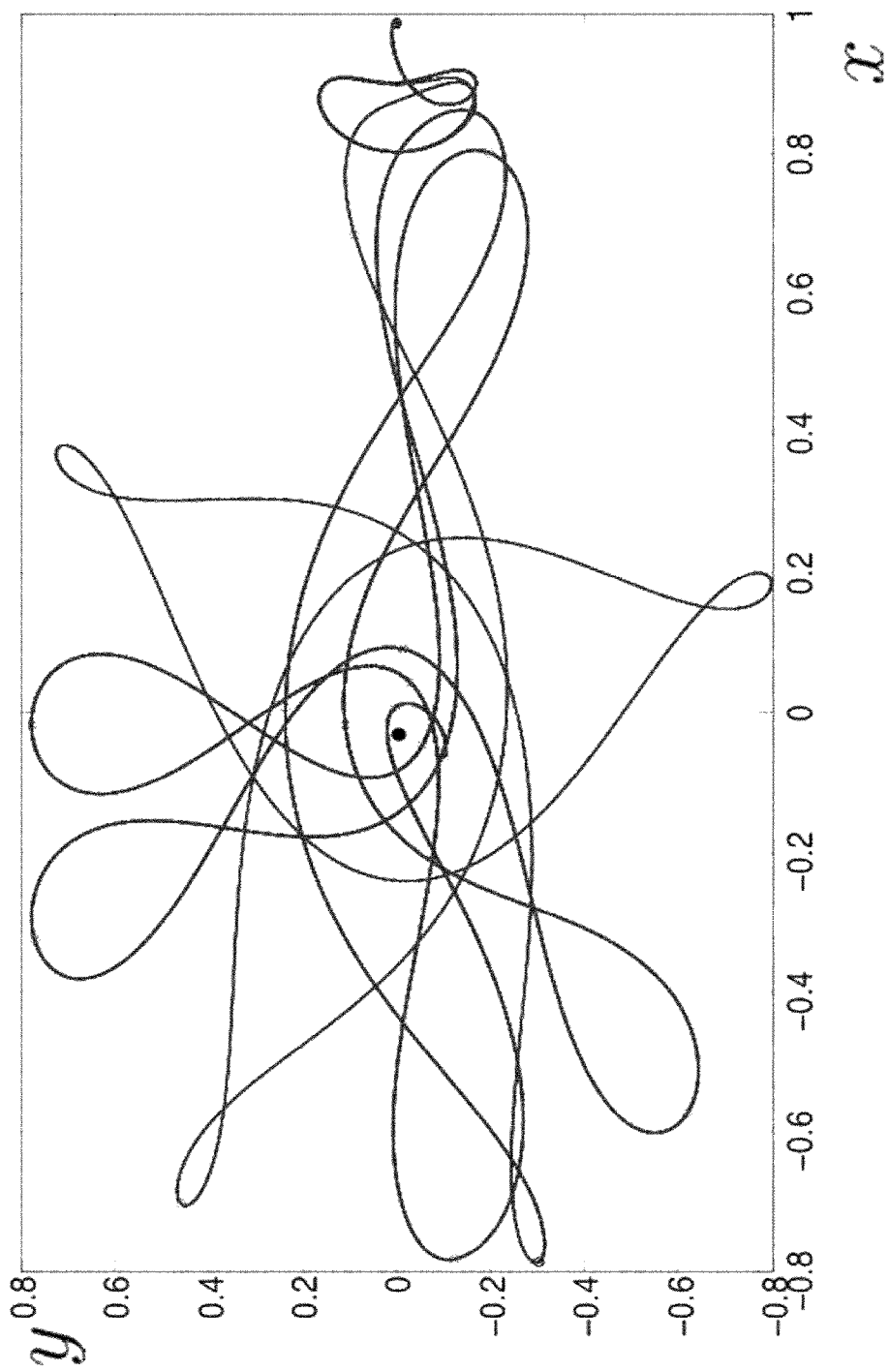

FIGS. 15 and 16 show examples of complete trajectory of the object in an inertial frame of reference, and in earth-moon rotating frame of reference, respectively.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling a motion of an object from a geostationary transit orbit (GTO) of an earth to an orbit of a moon, comprising:
   determining a first trajectory of the motion of the object from an intermediate orbit of an earth to a neighborhood of a stable manifold of a first Lagrange point (L1);
   determining a second trajectory of the motion of the object from the GTO to the intermediate orbit;
   determining a third trajectory of the motion of the object from the neighborhood of the stable manifold to an L1 orbit;
   determining a fourth trajectory of the motion of the object from the L1 orbit to the orbit of the moon; and
   determining a trajectory from the GTO to the orbit of the moon based on a combination of the first trajectory, the second trajectory, the third trajectory, and the fourth trajectory, wherein steps of the method are performed by a processor; wherein the determining the first trajectory further comprises:
   determining a set of zero-fuel trajectories from a set of orbits of the earth to the neighborhood using an approximate mapping of a perturbation of the motion by a gravity of the moon;
   selecting a zero-fuel trajectory optimizing the time of the trip; and
   modifying the zero-fuel trajectory to determine the first trajectory such that the first trajectory satisfies a constraint on the time of flight while optimizing the consumption of the fuel.

2. The method of claim 1, wherein each trajectory includes a set of initial conditions, a set of final conditions, and a set of controls.

3. The method of claim 1, further comprising:
   determining a topology of the first trajectory based on a topology of the zero-fuel trajectory and the function of the time of flight;
   selecting periapse and apoapse points at the zero-fuel trajectory according to the topology of the first trajectory;
   determining a cost function of controls applied to the object in the periapse and the apoapse points; and
   updating the first trajectory by optimizing the cost function subject to continuity constraints.

4. The method of claim 1, further comprising:
   initializing the second trajectory using a Hohmann transfer solution having the GTO as an initial condition and the set of initial conditions of the first trajectory as a final condition;
   determining a cost function of controls applied to the object in the periapse and apoapse points of the second trajectory; and
   updating the second trajectory by optimizing the cost function subject to continuity constraints.

5. The method of claim 1, further comprising:
   determining the first trajectory and the second trajectory using a multiple shooting method.

6. The method of claim 1, further comprising:
   determining the third trajectory and the fourth trajectory using a pseudo-spectral collocation method.

7. The method of claim 1, wherein the neighborhood of the stable manifold includes locations internal to the stable manifold.

8. The method of claim 1, further comprising:
   initializing the third trajectory based on the set of final conditions of the first trajectory and a point at L1 orbit;
   partitioning the third trajectory into a set of phases based on apses of the third trajectory, such that a phase connects two consecutive apses;
   determining a cost function of controls applied to the object at the end of each phase; and
   updating the third trajectory by optimizing the cost function using a pseudo-spectral collocation method.

9. The method of claim 1, further comprising:
   initializing the fourth trajectory based on the size of the L1 orbit using an unstable manifold of the L1 orbit;
   partitioning the fourth trajectory into a set of phases;
   determining a cost function of controls applied to the object at the end of each phase; and
   updating the fourth trajectory by optimizing the cost function using a pseudo-spectral collocation method.

10. The method of claim 9, wherein the set of phases includes two phases.

11. A method for controlling a motion of an object from a geostationary transit orbit (GTO) of an earth to an orbit of a moon, comprising:
    determining a first trajectory of the motion of the object from an intermediate orbit of an earth to a neighborhood of a stable manifold of a first Lagrange point (L1) as a function of a time of flight;
    determining a second trajectory of the motion of the object from the GTO to the intermediate orbit based on a set of initial conditions of the first trajectory;
    determining a third trajectory of the motion of the object from the neighborhood of the stable manifold to an L1 orbit based on a set of final conditions of the first trajectory;
    determining a fourth trajectory of the motion of the object from an L1 orbit to the orbit of the moon based on a size of the L1 orbit; and
    determining a trajectory from the GTO to the orbit of the moon as a combination of the first trajectory, the second trajectory, the third trajectory, and the fourth trajectory, wherein steps of the method are performed by a processor; wherein the determining the first trajectory further comprises:
    determining a set of zero-fuel trajectories from a set of orbits of the earth to the neighborhood using an approximate mapping of a perturbation of the motion by a gravity of the moon;
    selecting a zero-fuel trajectory optimizing the time of the trip; and
    modifying the zero-fuel trajectory to determine the first trajectory such that the first trajectory satisfies a constraint on the time of flight while optimizing the consumption of the fuel.

* * * * *